Sept. 26, 1939.　　　H. W. ZIMMERMAN　　　2,174,356
TORQUE-MEASURING WRENCH
Filed April 12, 1937　　　2 Sheets-Sheet 1
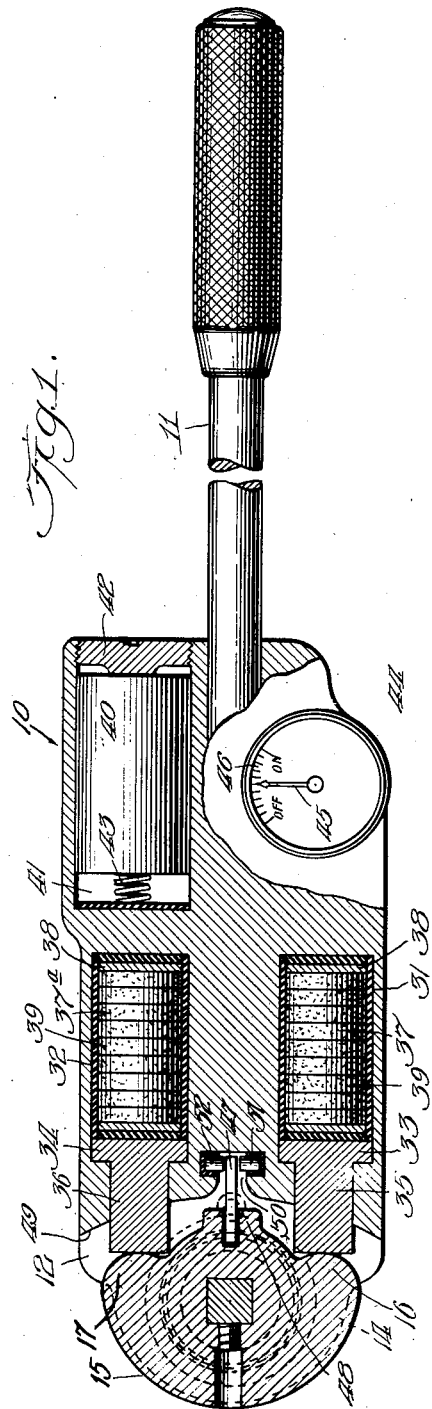
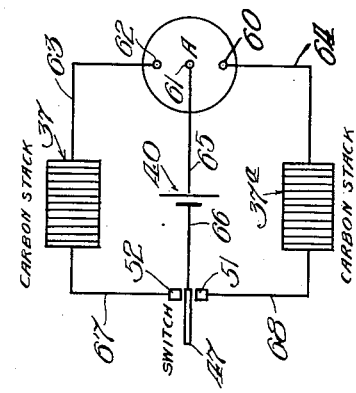
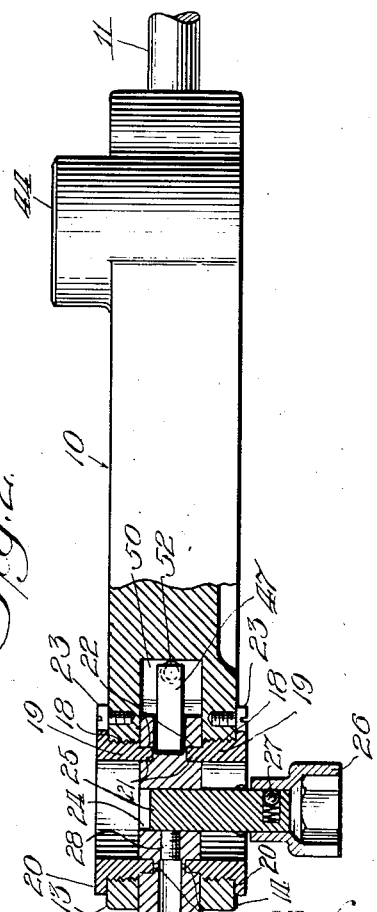

Sept. 26, 1939. H. W. ZIMMERMAN 2,174,356
TORQUE-MEASURING WRENCH
Filed April 12, 1937 2 Sheets-Sheet 2
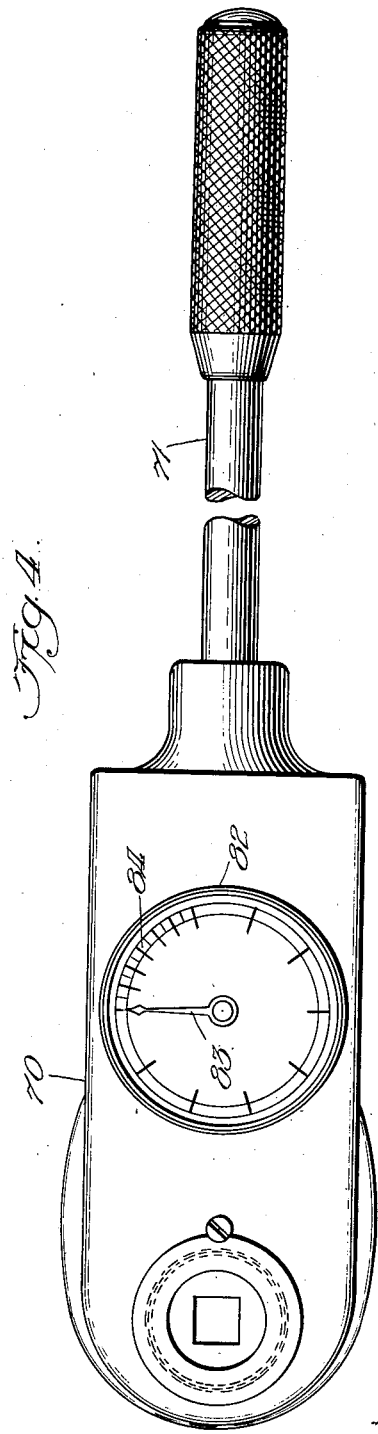
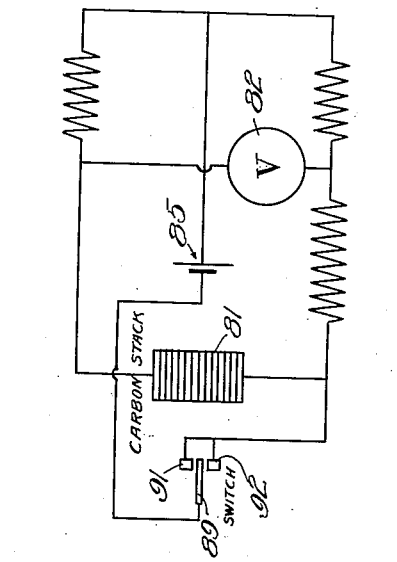
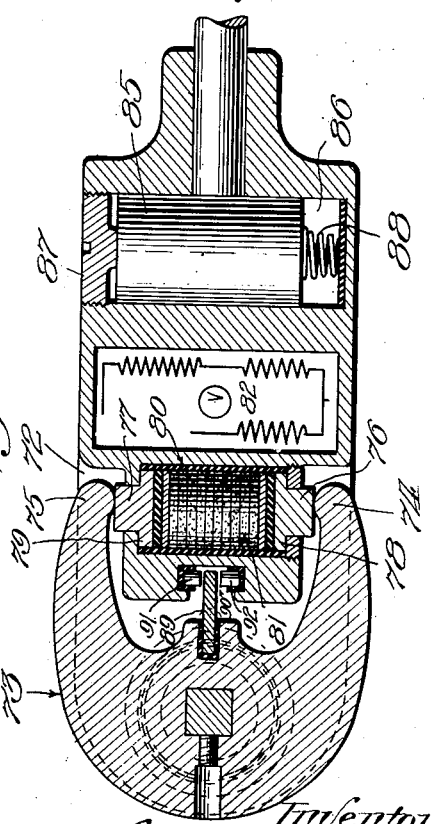
Inventor:
Herman W. Zimmerman
by Davis, Lindsey, Smith & Shonts
Attys.

Patented Sept. 26, 1939

2,174,356

UNITED STATES PATENT OFFICE 2,174,356

TORQUE-MEASURING WRENCH

Herman W. Zimmerman, Highland Park, Ill., assignor, by mesne assignments, to Frederick G. Wacker and Grace J. Wacker, Lake Forest, Ill.

Application April 12, 1937, Serial No. 136,309

11 Claims. (Cl. 265—1)

My invention relates to wrenches, and it has to do more particularly with a wrench adapted for measuring the force or torque applied therethrough in tightening, loosening or moving bolts, nuts, studs and other devices which may be generally termed "the work".

One of the objects of my invention is to provide an improved wrench of the foregoing character which is of simple and sturdy construction, and is inexpensive to manufacture, and which accurately performs its torque measuring function at all times.

Another object is to provide a torque measuring wrench constructed and arranged for electrically measuring the force or torque applied through the wrench to the work.

A more specific object is to provide an electric torque measuring wrench in which one or more carbon resistance stacks (rheostats) are employed as force transmitting parts, the arrangement being such that an electric current is passed through the carbon resistance stacks and the current passing therethrough is measured in terms of pressure applied to the work through such stacks.

Other objects and advantages become apparent as this description progresses, and by reference to the drawings wherein,—

Figure 1 is a top plan view, partially in horizontal section, of one form of wrench device embodying my invention;

Fig. 2 is a fragmentary side elevational view, partially in vertical section, of the structure shown in Fig. 1;

Fig. 3 is a wiring diagram illustrating one type of electrical circuit employed in the wrench structure shown in Figs. 1 and 2;

Fig. 4 is a top plan view of another form of wrench structure embodying my invention;

Fig. 5 is a horizontal section taken through the forward part of the structure shown in Fig. 4; and Fig. 6 is a wiring diagram illustrating one type of electrical circuit employed in the structure shown in Figs. 4 and 5.

The structure shown in Figs. 1 to 3, inclusive, includes an elongated body 10 to which a rearwardly extending handle 11 is secured in any desired manner. The forward end portion of the body 10 is bifurcate, providing a horizontal, laterally extending space 12 which is open at its sides and forward end and which is defined by a pair of vertically-spaced, plate-like body extensions 13, 14.

A rock member 15 is mounted in the space 12, This member 15 is of part-circular shape and it is constructed and arranged to provide opposed stub-arm elements 16 and 17 located on the opposite sides of the rock center of the member 15. The forward faces of the arm elements 16, 17 are rounded for a purpose which will be referred to more particularly hereinafter. The member 15 is rockably supported in the space 12 in the following manner. The body extensions 13 and 14 are provided with aligned, threaded openings 18, in each of which is received a similar threaded bushing 19. Each bushing is provided at its outer end with a head 20 which, when the bushing is fully screwed into the respective member 13, 14, seats upon the outer face of the respective member 13, 14. The inner ends of the bushings are provided with unthreaded annular guide tongues 21 which snugly engage in the aligned annular grooves 22 in the opposite faces of the rock member 15, thereby rotatably securing the rock member 15 within the space 12. The bushings 19 are locked against rotation in their fully assembled positions by set screws 23 engaging suitable threaded openings in the body 10 and so located that their head portions seat within the notches 25 formed in the peripheral edge portions of the bushings.

The rock member 15 is further provided, at its rock center, with a rectangular (or other irregularly shaped) opening 24 in which a similarly-shaped adapter element 25 is non-rotatably received. The element 25 is long enough to project downwardly through and beyond the bushing 19, where it receives a socket 26 or other suitable adapter device for engagement with the work. The socket 26 is frictionally retained on the adapter element 25 by a spring and ball unit 27 of well-known construction. The adapter element 25 is securely locked to the rock member 15, for rotation therewith, by a set screw 28 which engages the inner threaded portion of an opening 29 formed in the forward end wall of such rock member. Small passages 30 lead from opening 29 into the bottoms of grooves 22 and, by inserting a lubricant within the opening 29, the grooves 22 are lubricated, providing a lubricated bearing between the bushings 19 and the member 15.

It is highly desirable, in devices of this character, that the force or torque measuring means be of such nature as to accurately indicate at all times, under all weather conditions, and after long periods of use, the force or torque applied therethrough to the work. My invention provides electrical means for accomplishing this purpose.

Specifically, the body 10 (Fig. 1) is provided with a pair of laterally disposed, longitudinally-extending chambers 31 and 32 which are aligned with arm elements 16 and 17, and in which there are mounted piston-like pressure members 33 and 34, respectively. The pressure members 33, 34 are provided with reduced stems 35, 36 which pass through suitable openings into the space 12, and they are of such length that when the pressure members 33 and 34 are seated against the forward ends of the chambers 31 and 32 the outer ends of the plungers engage the curved faces of the arm elements 16 and 17 and hold the rock member 15 in a central, balanced position. Carbon resistance stacks or piles (rheostats) 37 and 37a are mounted in the chambers 31 and 32, respectively, rearwardly of the pressure members 33, 34 therein. The elements 37, 37a may take any suitable and well-known form, including brass discs 38 at the opposite ends of each element and a plurality of carbon discs or plates 39 disposed therebetween. Suitable insulation is provided around the elements 37 and 37a, insulating the same from the pressure members 33, 34 and from the body 10. Access to the chambers 31, 32 may be provided for in any desired manner; as, for example, by providing a suitable cover plate (not shown) for the upper or lower part of the body 10, which, when removed, will expose the chambers 31 and 32 for insertion or removal of the carbon elements.

The carbon elements 37 and 37a, as will be well understood, are of such a character that the resistance to flow of electrical current therethrough is decreased proportionately to the amount of pressure exerted on the carbon element. It will be seen in the structure so far described that, with the rock member 15 secured to the work through the socket 26, and when the wrench is being rotated by grasping the handle 11, the force required to move the work is applied from the operator through the handle 11, through the body 10, through the carbon elements 37 and 37a, through the plunger devices 35, 36 and rock member 15. In this way, pressure is exerted upon the carbon elements 37, 37a and, as this pressure is increased, by the added resistance to turning movement offered by the work, the pressure is increased upon the elements 37, 37a, reducing the resistance to flow of current therethrough. The current used in the particular form of my invention shown in Fig. 1 is supplied by a storage battery 40 mounted in a battery chamber 41 formed in the rear portion of the body. The battery is confined within the chamber 41 by a removable closure member 42, and it is urged into engagement with the member 42 by a spring 43 for proper electrical contact.

In this form of my invention, the current passing through the carbon elements 37, 37a from the battery 40 under the various pressure conditions is measured by an ammeter 44 which is of ordinary construction and which is adapted to function in the usual manner of devices of this character. The ammeter 44 includes an indicating hand 45 which is movable in opposite directions along a scale 46 which is calibrated to register the current passing through the carbon elements 37 in terms of inch-pounds pressure applied through the wrench to the work.

It is desirable in a device of this character, in order to minimize unnecessary lowering of battery potential, to provide a circuit closing arrangement which is of a more or less automatic or foolproof nature. To that end, I provide a switch structure including an elongated metallic switch element 47 located midway between the arm elements 16 and 17 and having one end fixedly secured in a slot formed in a lug portion 48 on the inner or rear face of the rock member 15. The wall 49 bounding the rear end of space 12 is provided with a recess 50 in the opposite side walls of which there are mounted electrical contacts 51 and 52 suitably insulated from the body 10. When the rock member 15 is in its central or balanced position, the switch element 47 is in a neutral position out of engagement with both of the contacts 51 and 52. However, when the wrench is applied to the work, and the work offers sufficient resistance to turning movement to result in compression of the then-active carbon element and, in turn, relative rock movement between the rock member 15 and the body 10, the switch element engages one of the contacts 51 and 52 and closes the electrical circuit; and when this happens the ammeter hand 45 is moved in the usual manner under the control of the current passing through the structure, thereby registering the pressure applied in terms of inch-pounds.

To facilitate description of the electrical connections between the various parts, reference is made to the wiring diagram of Fig. 3. Here it will be seen that the circuit employed is of a character well adapted for the use of an ammeter as an indicator. The ammeter 44 is provided with three terminals 60, 61 and 62. The ammeter terminal 62 is connected by a suitably insulated wire 63 to the carbon element 37, which is disposed in the chamber 31. The ammeter terminal 60 is connected to the other carbon element 37a which is located in the chamber 32 by a suitably insulated wire 64. The ammeter terminal 61 is connected by a suitably insulated wire 65 to the battery 40 which is, in turn, connected through a suitably insulated wiring 66 and suitable ground connections (not shown) to the switch element 47. The contact 52 is connected through suitably insulated wiring 67 to the carbon element 37 in the chamber 31 and the other switch element 51 is connected through suitably insulated wiring 68 to the other carbon element 37a.

In the use of the foregoing structure, the adapter member 26 is applied to the work and the handle 11 is moved in a clockwise direction (as viewed in Fig. 1) to tighten the work. As the work is tightened, relative rocking movement between the member 15 and body 10 is opposed by the pressure member 33 and the carbon pile 37 upon which it acts. The carbon element is, normally, subject to some compression, at least sufficiently to permit rocking movement of the member 15 to engage the switch element 47 with the contact 52 to complete or close the circuit through the battery 40, wire 66, switch elements 47, 52, wire 67, carbon pile 37, wire 63, ammeter 44 and wire 65 (Fig. 3). As soon as this circuit is closed, the ammeter hand 45 is moved clockwise (as viewed in Fig. 1) to a certain position along the scale 46, indicating in terms of current flow the amount of pressure that is being applied to the work at that time. As the nut is further tightened, the pressure exerted on the pressure member 33 and carbon pile 37 is increased, lowering the resistance of the carbon pile so that the ammeter hand 45 moves clockwise to a greater extent, indicating increased inch-pounds pressure applied to the work. When the wrench is used to loosen the work, or to move the work in a counterclockwise direction, the rock member 15 acts upon the pressure member 34 to compress the carbon element 37ª and, in turn, make contact between the switch element 47 and contact 51, at which time the circuit is closed through the battery 40, wire 66, switch elements 47 and 51, wire 68, carbon pile 37ª, wire 64, ammeter 44, and wire 65. As this circuit is completed, the ammeter hand 45 is moved in a counterclockwise direction (as viewed in Fig. 1) to an extent dependent upon the amount of pressure exerted upon the then-active carbon pile 37ª.

In certain cases, I may employ a single carbon pile or resistance stack instead of the two stacks shown in Figs. 1 to 3, inclusive. Such an arrangement is shown in Figs. 4 to 6, inclusive, and will now be described. This structure includes a body 70 having a handle 71 secured to its rear end and also having a space 72 at its forward end similar to the space 12 of Fig. 1, except that it is elongated for a purpose which will become obvious. A rock member 73 is mounted in the space 72 in a manner similar to the mounting of the rock member 15 (Figs. 2 and 5). The rock member 73 is provided with elongated arms 74 and 75 extending rearwardly in a longitudinal direction along the sides of the space 72 and having rounded end portions adapted to engage the outer ends of stems 76 and 77 of pressure members 78 and 79 mounted in a lateral chamber 80 in the body 70 between the rock member arms 74 and 75. A carbon resistance pile or stack 81 is mounted in the chamber 80, and this carbon pile functions similarly to the previously-described carbon piles 37 and 37ª. This single carbon pile 81 is acted upon by the rock member 73 when the wrench is moved to both tighten and loosen the work.

In this form the electric supply and indicating means includes a millivoltmeter 82 supported by the upper portion of the body 70. This voltmeter is provided with a hand 83 movable with respect to a scale 84 to an extent dependent upon the amount of current passing through the carbon pile 81. The scale 84 is calibrated to register current in terms of inch-pounds pressure applied to the work through the wrench. I also employ a battery 85 mounted in a lateral chamber 86 in the rear portion of the body 70, which chamber is closed by a removable cover 87 against which the battery 85 is yieldably pressed by spring 88 to insure proper electrical contact between the body and the battery terminal (not shown). I also employ a switch mechanism similar to that previously described, and which includes a switch element 89 carried by the rear portion of the rock member 73 and projecting forwardly into a recess 90 formed in the forward part of the body 70 at the rear end of the space 72. In the opposite sides of the recess 90 there are insulated contacts 91 and 92, which are engaged by the switch element 89 under the same conditions that the previously-described switch element 47 engages the contacts 51 and 52.

In this form of my invention (Figs. 4 to 6, inclusive), the switch structure 89—92, the carbon pile 81, the battery 85 and the voltmeter 82 are connected in a Wheatstone bridge circuit, the characteristics of which will be well understood by those skilled in the art. In the use of this circuit, any tendency toward inaccuracy due to difference of battery potential is eliminated and, even though the power, so to speak, of the battery 85 is reduced, an accurate pressure indication will be given by the voltmeter 82 by the movement of its hand 83 in response to current vaiations caused by varying pressure applied through the carbon pile 81 to the work. To facilitate the description of this form of my invention, reference is made to the wiring diagram shown in Fig. 6, which illustrates the several parts electrically connected together in a Wheatstone bridge type of circuit. It will be seen, by reference to Figs. 4 to 6, that when the wrench is applied to the work and moved in a clockwise direction (as viewed in Figs. 4 and 5), the switch element 89 is engaged with the contact 91 as soon as the work offers a resistance requiring the application of a force sufficient to compress the carbon pile 81 to an extent to permit the rock movement of the member 73 to effect the contact referred to. When this contact is made, the circuit is completed through the battery 85, switch elements 89 and 91, and voltmeter 82, causing the hand 83 of the voltmeter to move to a predetermined extent as determined by the amount of current passing through the carbon resistance stack or pile 81. The voltmeter registers this current in terms of inch-pounds pressure, as above stated. When the wrench is moved in the opposite direction and the switch element 89 contacts the switch contact 92, the circuit through the parts above mentioned is also closed and a similar indicating result takes place. In both of these instances, the current flow is such that the hand 83 of the voltmeter moves in clockwise direction (as viewed in Fig. 4). Other than above mentioned, the operation of this form of device is the same as that previously described.

It is believed that the operation advantages of my invention will be well understood from the foregoing. A wrench embodying the foregoing features is adapted to accurately measure the force or torque applied through the wrench to the work, notwithstanding variable weather or other operating conditions. In the use of my invention, nuts, bolts, studs and other kinds of work may be loosened, tightened or moved to any predetermined extent without the necessity of using skilled labor. Distortion and breakage of such fastening devices are avoided, and their life of usefulness is greatly increased. A wrench embodying this invention is quite useful in setting up a series of bolts, studs and the like, particularly where such devices must all be set up, essentially, in a uniform manner.

It will be understood that although I have shown two forms of structure embodying my invention, other changes in details and arrangements of parts may be resorted to without departing from the spirit and scope of my invention as defined by the claims that follow.

I claim:

1. In a torque measuring wrench, a member having provision for operatively engaging the work, a second member rotatably connected to said first member, electrical means disposed between said two members and controlled by the force or torque applied to said first member through said second member for measuring the amount of force or torque applied to the work, said electrical means including switch means operable by relative rotation of said two members for cutting in and out said electrical means so that the latter is effective only when pressure is applied through the wrench to a piece of work.

2. In a torque measuring wrench, a body member, a member rockable thereon and having provision for engagement with the work, an electrical resistance means between said members and operably engaged therewith for opposing relative rock movement thereof, the arrangement being such that the force or torque is applied to the work through said members and said resistance means, said resistance means including a carbon resistance stack through which the force or torque is applied to the work, means for supplying an electric current to and through said stack, switch means operable by relative rock movement between said members for cutting in and out said supply means and indicating means registering the current passing through said stack in terms of pressure applied to said stack in tightening, loosening or moving the work.

3. In a torque measuring wrench, a rock member having provision for engaging the work, a support member upon which said rock member rocks, an electrical resistance means between and opposing relative rock movement of said members, said means being of a character adapted to offer a variable resistance as pressure exerted thereon is varied, means for supplying electric current to and through said resistance means, means controlled by relative rock movement between said members for closing the electric circuit through said resistance means, and indicating means registering the flow of current through said resistance means in terms of pressure exerted to tighten, loosen or otherwise move the work.

4. In a torque measuring wrench, a rock member having provision for engaging the work, a support member upon which said rock member rocks, a carbon resistance means between and opposing relative rock movement of said members, an electric circuit in which said carbon resistance means is disposed and in which is located a current supply means, and switch elements carried by said members for closing said circuit upon predetermined relative rock movement between said members, an electric current registering means in said circuit having a calibrated dial member and an indicator element movable relative thereto for registering current passing through said carbon resistance means in terms of pressure applied through the carbon resistance means to the work.

5. A torque measuring wrench comprising a body member, a member rockably supported by said body member and having provision for operative connection with the work, said rock member having opposed arm elements on the opposite sides of the rock center thereof, electrical resistance means disposed between said arm elements and said body member and opposing relative rock movement of said members, said electrical resistance means being of a character adapted to offer less electrical resistance upon the application of increased pressure thereto, and vice versa, an electric supply means in circuit with said electrical resistance means, means controlled by relative rock movement of said members for cutting in and out said supply means, and indicating means in circuit with said resistance means and said supply means and adapted to register current flow through said resistance means in terms of pressure applied to the work through said members and said resistance means.

6. A torque measuring wrench comprising a body member, a member rockably supported by said body member and having provision for operably engaging the work, opposed arm elements on the opposite sides of the rock center of said rock member, and electrical resistance means operably associated with each of said arm elements and opposing rock movement of said rock member in either direction, an electric current supply connected in circuit with both said electric resistance means, a current registering device in circuit with said current supply means and said electrical resistance means, and switch means associated with said members and operable by relative rock movement thereof to open or close the electric circuit through said supply means, said registering device and one or the other of said resistance means, dependent upon the direction of rock movement of said rock member.

7. A torque measuring wrench comprising a body member, a member rockably supported by said body member and having provision for operative engagement with the work, arm elements on the opposite sides of the rock center of said rock member, carbon resistance stacks carried by said body member in alignment with said arm elements, pressure members between said carbon resistance stacks and said arm elements, electric current supply means in circuit with both of said carbon resistance stacks, current registering means in circuit with said supply means and both of said carbon resistance stacks, and switch means associated with said members and operated by said relative rock movement between said members to open or close the electric circuit through said supply means, said registering device and one or the other of said carbon resistance stacks, dependent upon the direction of rock movement of said rock member relative to said body member.

8. A torque measuring wrench comprising a body member, a member rockably supported by said body member and having provision for operable engagement with the work, arms on said rock member, an electrical resistance element carried by said body member and adapted to be operatively engaged by both of said arms to apply pressure thereto in a direction dependent upon the direction of rock movement of said rock member relative to said body member, said electrical resistance means being of a character adapted to offer variable resistance to flow of electric current upon variation in pressure applied thereto, means in circuit with said electric resistance means for supplying electric current thereto, and means in circuit with said supply means and said resistance means for registering the flow of current through said resistance means in terms of pressure applied through said body member, said resistance means and said rock member to the work.

9. A torque measuring wrench comprising a body member, a member rockably supported thereby and having provision for operatively engaging the work, arm members on said rock member extending along said body member, a carbon resistance stack carried by said body member at such a position that its opposite ends are aligned with said arms, pressure members between said arms and the opposite ends of said carbon resistance stack, electric supply means in circuit with said carbon resistance stack, and means for registering current flow through said carbon resistance stack in terms of pressure applied through said body member, said stack and rock member to the work.

10. A torque measuring wrench comprising a body member, a member rockably supported thereby and having provision for operatively engaging the work, arm members on said rock member and extending along said body member, a carbon resistance stack carried by said body member and disposed laterally between said arms, means operatively connecting each said arm with said carbon resistance stack, electric current supply means in circuit with said carbon resistance stack, current registering means in circuit with said supply means and said carbon resistance stack and having a scale calibrated to indicate current flow in terms of pressure applied through the carbon resistance stack to the work, and switch means controlled by rock movement of said rock member for opening and closing the electric circuit through said supply means, said registering device and carbon resistance stack.

11. In a torque measuring wrench, a member having provision for operatively engaging the work, a second member through which pressure is applied to the wrench, electrical means disposed between said two members and controlled by relative movement of said members for measuring the amount of force or torque applied to the work, said electrical means including switch means adapted to be closed by relative movement of said two members for cutting in and out said electrical means so that the latter is effective only when pressure is applied through the wrench to a piece of work.

HERMAN W. ZIMMERMAN.